United States Patent
Huang

(10) Patent No.: US 9,916,523 B2
(45) Date of Patent: Mar. 13, 2018

(12) United States Patent

(54) AUTOMATIC PICTURE CLASSIFYING SYSTEM AND METHOD IN A DINING ENVIRONMENT

(71) Applicant: Digital Drift Co.LTD, Taipei (TW)

(72) Inventor: Chien-Wei Huang, Taipei (TW)

(73) Assignee: Digital Drift Co.LTD, Taipei (TW)

( * ) Notice: Subject to any disclaimer, the term of this patent is extended or adjusted under 35 U.S.C. 154(b) by 13 days.

(21) Appl. No.: 15/132,313

(22) Filed: Apr. 19, 2016

(65) Prior Publication Data

US 2017/0109614 A1  Apr. 20, 2017

(30) Foreign Application Priority Data

Oct. 20, 2015  (TW) .............................. 104134437 A

(51) Int. Cl.
*G06K 9/62* (2006.01)
*H04L 29/08* (2006.01)
*G06K 9/00* (2006.01)

(52) U.S. Cl.
CPC ....... *G06K 9/6267* (2013.01); *G06K 9/00671* (2013.01); *G06K 9/00691* (2013.01); *H04L 67/02* (2013.01); *G06K 2209/17* (2013.01)

(58) Field of Classification Search
CPC .. G06K 9/00671; G06K 9/00691; G06K 9/03; G06K 9/6202; G06K 9/6267; G06K 9/66; G06K 2209/17; H04L 67/02
See application file for complete search history.

(56) References Cited

U.S. PATENT DOCUMENTS

| | | | | |
|---|---|---|---|---|
| 2007/0081813 A1* | 4/2007 | Hong | ..................... | G03B 17/24 396/310 |
| 2011/0058743 A1* | 3/2011 | Myers | ................ | G06K 9/00288 382/190 |
| 2013/0148881 A1* | 6/2013 | Xue | ..................... | G06K 9/6256 382/159 |
| 2014/0205139 A1* | 7/2014 | Kriel | ................. | G06K 9/00805 382/103 |
| 2016/0189007 A1* | 6/2016 | Wellington | ............... | G06T 7/12 382/110 |
| 2017/0109614 A1* | 4/2017 | Huang | ................. | G06K 9/6267 |

FOREIGN PATENT DOCUMENTS

| | | |
|---|---|---|
| CN | 104361357 A | 2/2015 |
| CN | 104424345 A | 3/2015 |
| CN | 104778374 A | 7/2015 |
| TW | 201508511 A1 | 3/2015 |

OTHER PUBLICATIONS

Office Action dated Apr. 26, 2016 in connection with Taiwanese Application No. 104134437, 10 pages.

* cited by examiner

*Primary Examiner* — Edward Park

(57) ABSTRACT

An automatic classifying system in a dining environment includes a picture uploading module implemented in an electronic device for transmitting a set of pictures via the Internet, and a server for directly or indirectly receiving the set of pictures. The server has a picture analysis module for classifying one of the pictures according to at least two classifications and generating an analysis result to a web-platform system so as to display the picture and the analysis result.

10 Claims, 15 Drawing Sheets

AUTOMATIC PICTURE CLASSIFYING SYSTEM AND METHOD IN A DINING ENVIRONMENT

BACKGROUND OF THE INVENTION

1. Field of the Invention

The present invention relates to a picture classifying system and, more particularly, to an automatic picture classifying system in a dining environment.

2. Description of Related Art

With development of portable devices, Internet is getting more and more important to the life of human beings. Food and beverage (F&B) weblogs on the Internet have become one way of knowing restaurants in everyday life. Thus, it is frequently seen that people take pictures in a restaurant and upload it to the blog for sharing the contents of the restaurant with others. However, such an operation mode needs a user to manually classify the pictures and, in case of a large number of pictures photographed by the user at one time, the classifying behavior wastes lots of time and thus is inconvenient and likely to encounter a classification mistake. Furthermore, the restaurant's information cannot be known immediately by others at such an operation mode, and instead a search is required for finding the blog, which also leads to an inconvenience.

Therefore, it is desirable to provide an automatic classifying system with a rapid and automatic classification to a user and with a more convenient interface to others for easily obtaining a restaurant's information provided by the user, so as to mitigate and/or obviate the aforementioned problems.

SUMMARY OF THE INVENTION

It is an object of the present invention to provide an automatic classifying system in a dining environment, including a picture uploading module implemented in an electronic device for transmitting a set of pictures via the Internet, and a server for directly or indirectly receiving the set of pictures, the server including a picture analysis module for classifying one of the pictures according to at least two classifications and generating an analysis result to a web-platform system so as to display the picture and the analysis result.

In a preferred embodiment, the picture analysis module includes at least two analyzing modules selected from an appearance analyzing module, a staff analyzing module, a menu analyzing module, a main course analyzing module, a drink analyzing module, and a dessert analyzing module. Accordingly, the picture analysis module can classify the pictures according to at least two of the appearance classification, staff classification, menu classification, main course classification, drink classification, and dessert classification.

In a preferred embodiment, the server further includes a classification check module to determine whether previous and next pictures of a checked picture among the set of pictures are of the same classification. When the previous picture and the next picture are of the same classification, the highest classification weight corresponding to the checked picture is compared with a weight approximation corresponding to the classification of the previous and next pictures, and the checked picture is re-assigned to the classification of the previous and next pictures when the highest classification weight is smaller than the weight approximation.

Thus, the automatic classifying system can automatically classify pictures selected by a user and publish them in the web-platform system. When other users online access the web-platform system, they can browse the pictures and rapidly get the desired information via the classifications. In addition, the automatic classifying system can have a verifying function through the analysis result, so as to have more accuracy in the classified result.

It is another object of the present invention to provide an automatic classifying method in a dining environment, which is performed by an automatic classifying system. The method includes: using a picture uploading module to transmit a set of pictures via the Internet; using a server to directly or indirectly receive the set of pictures; using a picture analysis module of the server to classify one of the pictures according to at least two classifications and generate an analysis result; using the server to transmit the analysis result to a web-platform system; and using the web-platform system to display the picture and the analysis result.

In a preferred embodiment, the picture analysis module includes at least two analyzing modules selected from an appearance analyzing module, a staff analyzing module, a menu analyzing module, a main course analyzing module, a drink analyzing module, and a dessert analyzing module. Accordingly, the picture analysis module can classify the pictures according to at least two of the appearance classification, staff classification, menu classification, main course classification, drink classification, and dessert classification.

In a preferred embodiment, the method further includes using a classification check module to determine whether previous and next pictures of a checked picture among the set of pictures are of the same classification. When the previous and next pictures are of the same classification, the highest classification weight corresponding to the checked picture is compared with a weight approximation corresponding to the classification of the previous and next pictures, and the checked picture is re-assigned to the classification of the previous and next pictures when the highest classification weight is smaller than the weight approximation.

Thus, the automatic classifying method can automatically classify pictures selected by a user and publish them in the web-platform system. When other users online access the web-platform system, they can browse the pictures and rapidly get the desired information via the classifications. In addition, the automatic classifying method can have a verifying function through the analysis result, so as to allow the classified result to be more accurate.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
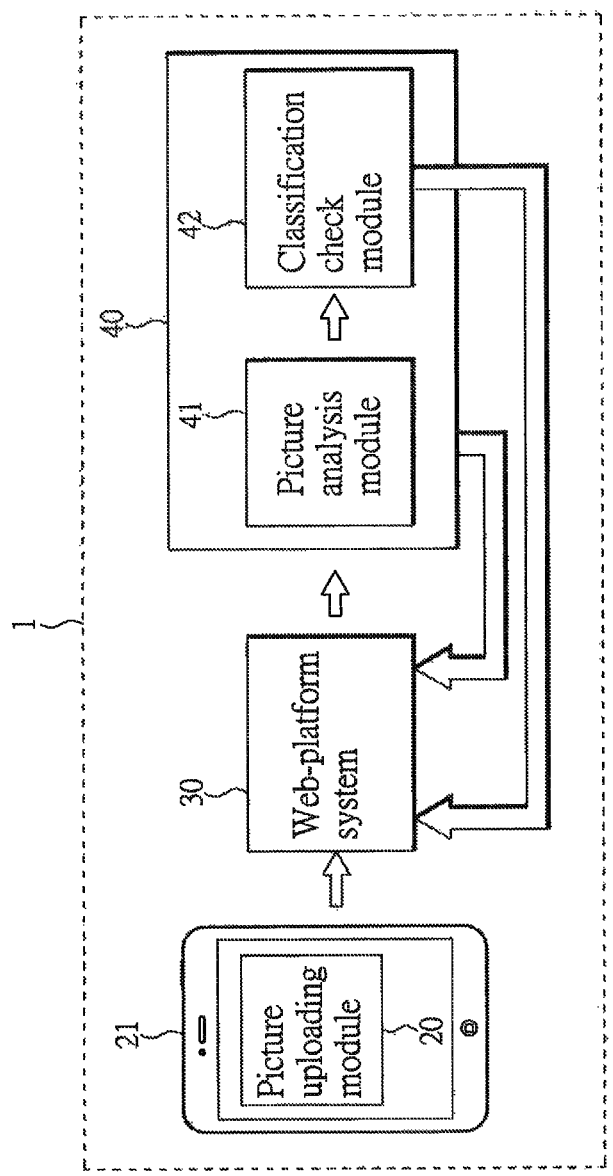
FIG. 1 schematically illustrates a configuration of an automatic classifying system in a dining environment according to the invention.

FIG. 1 schematically illustrates a configuration of an automatic classifying system 1 in a dining environment according to the invention. The automatic classifying system 1 includes a picture uploading module 20, a web-platform system 30, and a server 40. The picture uploading module 20, the web-platform system 30, and the server 40 are in communication with each other via the Internet or a wireless network, for example. The web-platform system 30 and the server 40 can be of the same device, or the web-platform system 30 is configured in the server 40 and connected to the picture uploading module 20 via the Internet. Alternatively, the web-platform system 30 can be configured in another device. The picture uploading module 20 is implemented in an electronic device 21 for transmitting a set of pictures out of the electronic device 21. For example, the restaurant's pictures photographed by a user are uploaded to the web-platform system 30. The web-platform system 3 receives the pictures from the electronic device 21 and transmits them to the sever 40. In addition, the web-platform system 30 can display the pictures and allow multiple users to concurrently browse them via the Internet. The server 40 includes a picture analysis module 41 for automatically classifying the pictures and generating an analysis result, along with the classified pictures, to a web-platform system 30 thereby displaying the classified pictures. In other embodiments, the picture analysis module 41 can directly transmit the pictures to the server 40 for further processing, without passing through the web-platform system 30. Thus, the pictures photographed by a user in a dining experience are uploaded to the Internet through the picture uploading module 20, such that the server 40 can analyze and automatically classify the pictures, and publish the classified pictures in the web-platform system 30.

The picture uploading module 20 is implemented in the electronic device 21. The electronic device 21 is preferably a computing device with a microprocessor such as a personal computer (PC), and more preferably a portable mobile device such as a smartphone, notebook computer, tablet PC, and the like. In practice, a device with a network communication capability can be regarded as the electronic device 21 with the picture uploading module 20. The picture uploading module 20 is preferably a computer program implemented in the electronic device 21 for uploading the pictures stored in the electronic device 21 to the Internet, for example to the web-platform system 30. In some embodiments, the picture uploading module 20 can be a microprocessor, microcontroller, or transmission interface in the electronic device 21, or driving software for the hardware of the electronic device 21 for driving the electronic device 21 to upload the pictures.

Figures 2, 3:
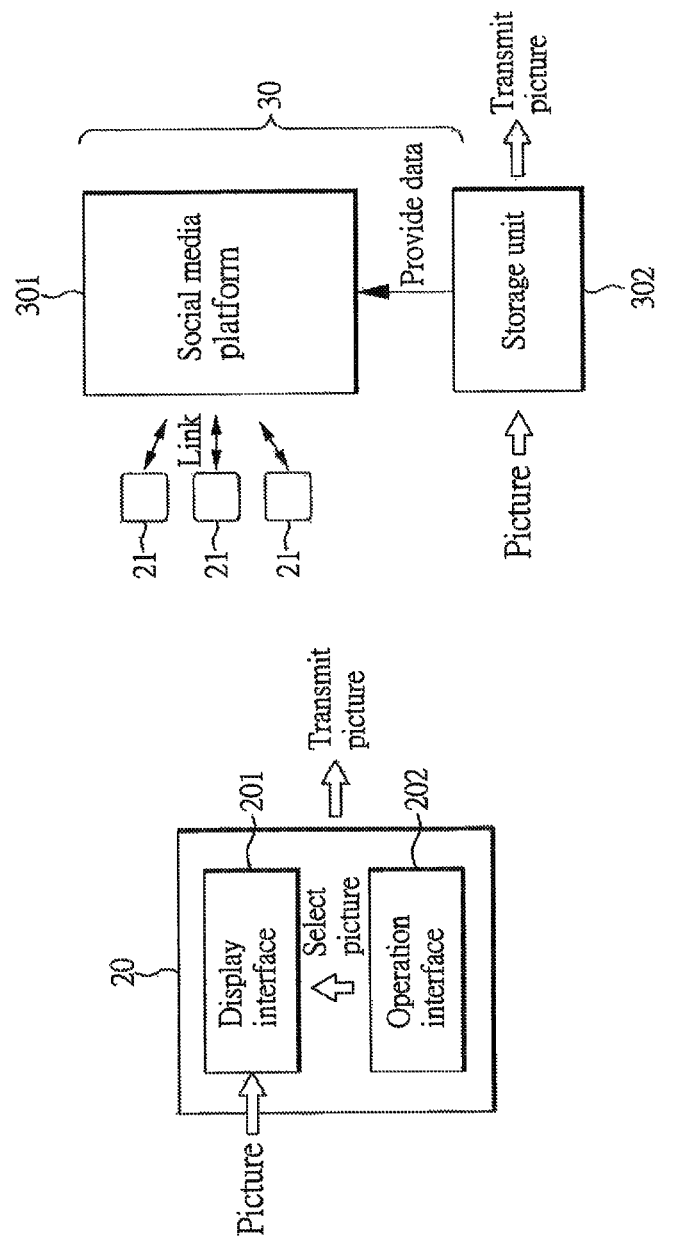
FIG. 2 schematically illustrates a preferred configuration of a picture uploading module according to the invention.
FIG. 3 schematically illustrates a preferred configuration of a web-platform system according to the invention.

With the computer program, the picture uploading module 20 can have a display interface 201 and an operation interface 202. FIG. 2 schematically illustrates the detail of the picture uploading module 20 according to the invention. The display interface 201 of the picture uploading module 20 displays a set of pictures. Preferably, the pictures are a set of pictures provided in a period of time, such as a plurality of pictures in a dining experience of a user. The operation interface 202 allows the user to select the pictures to be uploaded, and subsequently the picture uploading module 20 uploads the selected pictures to the web-platform system 30 via the Internet. In other embodiments, the picture uploading module 20 can directly upload the selected pictures to the server 40. In addition, it is noted that the display interface 201 and the operation interface 202 can be integrated with each other if the electronic device 21 has a touch function, thereby allowing the user to touch and select the pictures.

FIG. 3 schematically illustrates a preferred configuration of the web-platform system 30 according to the invention. The web-platform system 30 includes a social media platform 301 and a storage unit 302. The social media platform 301 can be linked to a plurality of electronic devices 21 for displaying data, such that the users of the electronic devices 21 can browse the data through their electronic devices 21. For example, after one user uploads a set of pictures to the web-platform system 30, the other users can browse the pictures on the social media platform 301. The storage unit 302 stores the data of the web-platform system 30. Namely, when the web-platform system 30 receives a set of pictures, it can store the set of pictures in the storage unit 302. Next, the web-platform system 30 can transmit the stored pictures to the server 40 via the Internet for analysis and receive analysis results from the server 40, and finally store the analysis results of each picture in the storage unit 302. It is noted that the server 40 transmits both the pictures and their analysis results to the web-platform system 30 when the picture uploading module 20 transmits the pictures to the server 40 in order to perform an analysis directly.

Figure 4A:
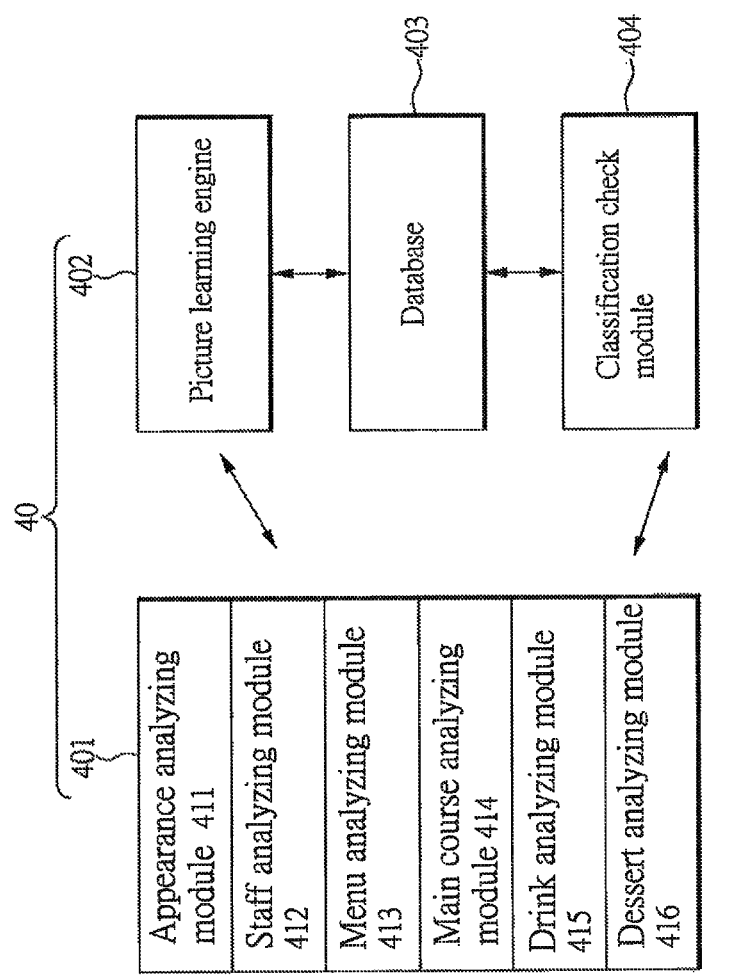
FIG. 4(A) schematically illustrates a preferred configuration of a server according to the invention.

FIG. 4(A) schematically illustrates a preferred configuration of the server 40 according to the invention. The server 40 has a picture analysis module 401, a picture learning engine 402, and a database 403. The picture analysis module 401, the picture learning engine 402, and the database 403 are in communication with each other. The picture analysis module 401 is preferably comprised of an appearance analyzing module 411, a staff analyzing module 412, a menu analyzing module 413, a main course analyzing module 414, a drink analyzing module 415, and a dessert analyzing module 416. In practice, the picture analysis module 401 includes at least two of the aforementioned modules 411-416, which are used by the picture analysis module 401 to analyze classifications of the pictures. Namely, the pictures photographed by a user and uploaded to the server 40 can be classified as appearance, staff, menu, main course, drink, and dessert classifications. In addition, two or more of the aforementioned modules 411-416 can be merged into one module. For example, a main course and a dessert are regarded as the same classification in certain situation, and in this case the main course analyzing module 414 and the dessert analyzing module 416 are of the same module, so the pictures associated with the main course and the dessert are classified as the same classification.

The appearance analyzing module 411 analyzes a picture to determine whether the picture is based on a restaurant's appearance. The staff analyzing module 412 analyzes a picture to determine whether the picture is based on people. The menu analyzing module 413 analyzes a picture to determine whether the picture is based on a menu. The main course analyzing module 414 analyzes a picture to determine whether the picture is based on a main course. The drink analyzing module 415 analyzes a picture to determine whether the picture is based on a drink. The dessert analyzing module 416 analyzes a picture to determine whether the picture is based on a dessert. The picture learning engine 402 is an engine architecture which is written according to an algorithm for automatically finding the regularity in the pictures. Preferably, the picture leaning engine 402 is made by deep leaning framework algorithm known as Caffe. Such a framework algorithm allows the picture leaning engine 402 to automatically find the regularity in a great amount of pictures. For example, a user inputs, in advance, a great amount of pictures grouped as the same classification to the server 40, and the picture leaning engine 402 can find the regularity in the pictures and apply it to analyze future pictures to be uploaded by the user or others. The database 403 stores a plurality of pictures. Preferably, the database 403 pre-stores a great amount of pictures for each classification that are pre-input to the database 403, so that the picture leaning engine 402 can automatically find a feature of the classification according to the pictures. For example, one hundred pictures are pre-input into the main course classification, and in this case the picture leaning engine 402 extracts or finds a feature from the one hundred pictures and so as to classify pictures received in the future based on the feature.

Thus, when the server 40 receives a set of pictures from the picture uploading module 20 or the web-platform system 30, each of the analyzing modules 411-416 of the picture analysis module 401 analyzes each picture in the set of pictures. For example, the main course analyzing module 414 compares the picture with a correlation of the great amount of pictures in the main course classification to find a weight of the picture in the main course classification. When the comparison result is getting more compliant with the correlation, the value of the weight is increased. After the analyzing modules 411-416 of each classification have obtained the weight of the picture, the picture analysis module 401 finds a highest classification weight by comparing the weights of the classifications so as to assign the picture to the classification corresponding to the highest classification weight and finally generate an analysis result. Next, the server 40 transmits the picture and the analysis result to the web-platform system 30.

Figure 4B:
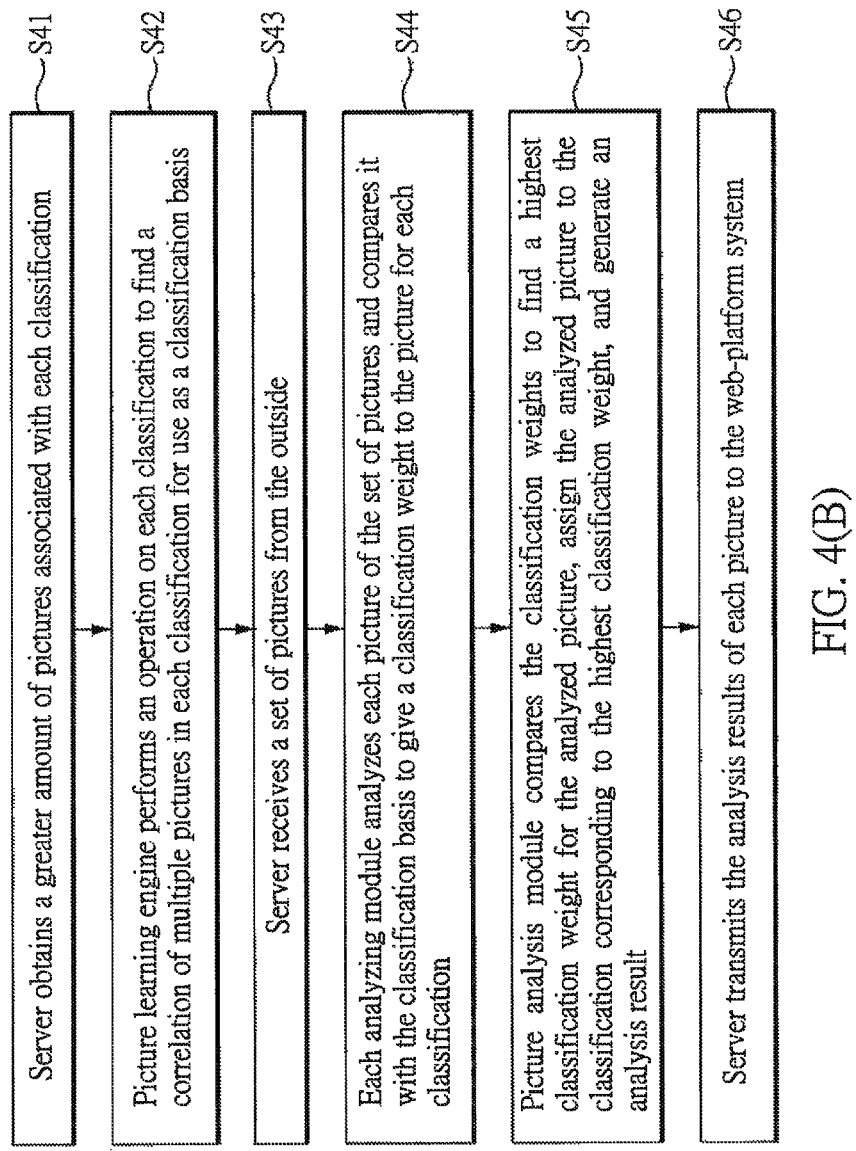
FIG. 4(B) is a flowchart illustrating an operation of a server according to the invention.

FIG. 4(B) is a flowchart illustrating a detailed operation of the server 40 according to the invention. First, step S41 is executed, in which the server 40 obtains a great amount of pictures associated with each classification and stores them in the database 403. Next, step S42 is executed, in which the picture learning engine 402 performs an operation on each classification stored in the database 403 in order to find a correlation of multiple pictures in each classification for use as a classification basis of the classification and store it in the database 30. Next, step S43 is executed, in which the server 40 receives a set of pictures from the outside. Next, step S44 is executed, in which each of the analyzing modules 411-416 of the picture analysis module 401 analyzes each picture of the set of pictures, wherein each of the analyzing modules 411-416 obtains the classification basis from the database 30 and compares it with each picture so as to give a classification weight to the picture for each classification. Thus, each picture has six classification weights. Next, step S45 is executed, in which the picture analysis module 401 analyzes each picture, assigns the classification corresponding to the highest classification weight in one picture to the classification of the picture, and generates an analysis result. Next, step S46 is executed, in which the server 40 transmits the analysis result of each picture to the web-platform system 30.

In addition, with reference to FIG. 4(A) again, in another preferred embodiment of the present invention, the server 40 may further include a classification check module 404. The classification check module 404 checks whether the analysis result generated by the picture analysis module 401 has to be corrected or not. The checking is required due to that, in the analysis process, a classification mistake may occur when the weights of two classifications for the picture are very close. For example, there are three pictures actually belong to the dessert classification, but the middle one of the three pictures is classified as the main course classification because it has a weight of the dessert classification slightly smaller than that of the main course classification due to its feature is not obvious in certain photographic situation. Thus, a classification mistake occurs, and a check and correction of the classification check module 404 is required in this case.

Figure 5A:
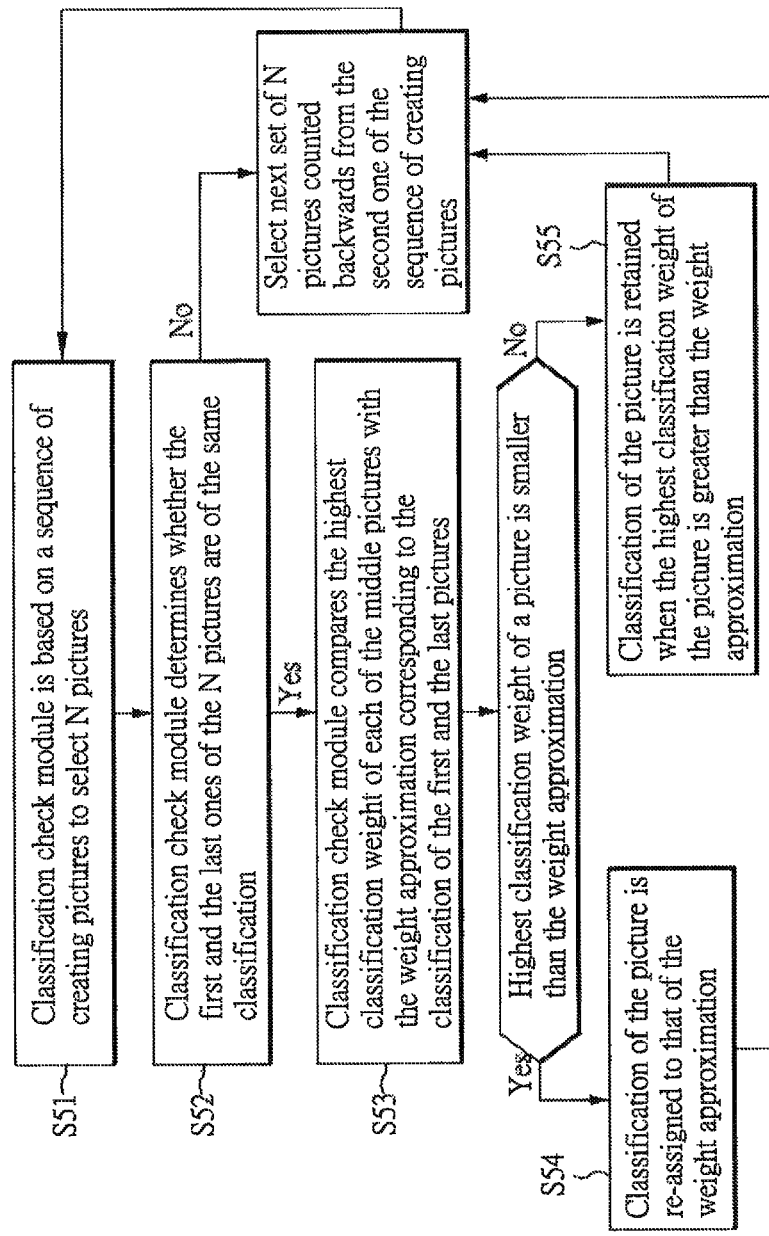
FIG. 5(A) is a flowchart illustrating a check operated by a classification check module according to the invention.

The classification check module 404 presets a weight approximation for each classification and uses the weight approximation to check whether to correct the classification of the picture to be checked. FIG. 5(A) is a flowchart illustrating a detailed operation of the classification check module 404 according to the invention. First, step S51 is executed, in which the classification check module 404 is based on a sequence of creating pictures, i.e., photographing sequence, to select N pictures, where N is a positive integer greater than three. Next, step S52 is executed, in which the classification check module 404 determines whether the first and the last ones of the N pictures are of the same classification. When the first picture and the last picture are not of the same classification, this check is terminated, and a second check is performed on a next set of N pictures starting with the second picture in the sequence of creating pictures. When the first picture and the last picture of the N pictures in the second check are of the same classification, step S53 is executed, in which the classification check module 404 compares the highest classification weight of each of the middle pictures (i.e., every picture except the first and the last pictures) with the weight approximation corresponding to the classification of the first and the last pictures. When the highest classification weight of a picture is smaller than the weight approximation, step S54 is executed, in which the classification of the picture is re-assigned to that of the weight approximation. Conversely, step S55 is executed to retain the classification of the picture when the highest classification weight of the picture is greater than the weight approximation. Subsequently, a next set of N pictures starting with the second one of the sequence of creating pictures are selected to take another check.

Figure 5B:
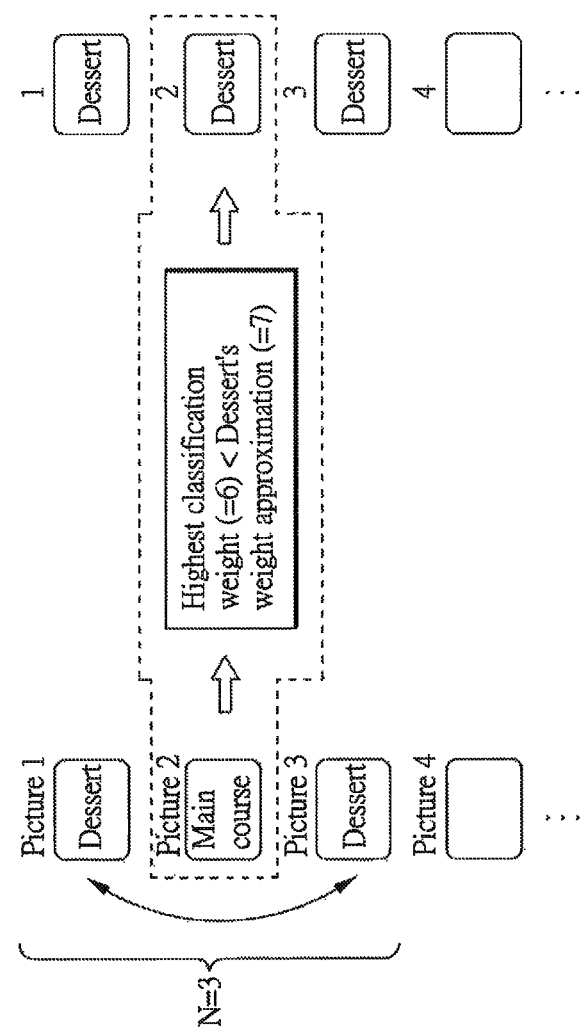
FIG. 5(B) schematically illustrates a practical process of FIG. 5(A) according to the invention.

FIG. 5(B) schematically illustrates a practical process of FIG. 5(A) according to the invention. As shown in FIG. 5(B), the first and the last pictures of three pictures are of the dessert classification, and the middle one is of the main course classification. The classification check module 404 compares the highest classification weight of the middle picture with the weight approximation of the dessert classification. In this case, the highest classification weight of the middle picture is six, and the weight approximation of the dessert classification is seven, so that the classification check module 404 re-assigns the classification of the middle picture to the dessert classification.

Furthermore, in certain situations, the classification check module 404 predefines a test number to determine the number of pictures to be checked on classification, such as twenty pictures to be checked on classification (i.e., taking the check twenty times), so as to keep the stability of the server. However, such a setting has a disadvantage in that, when there are more than twenty-one pictures uploaded, the last one cannot be checked. Therefore, in some embodiments, the classification check module 404 may perform another check.

Figure 6A:
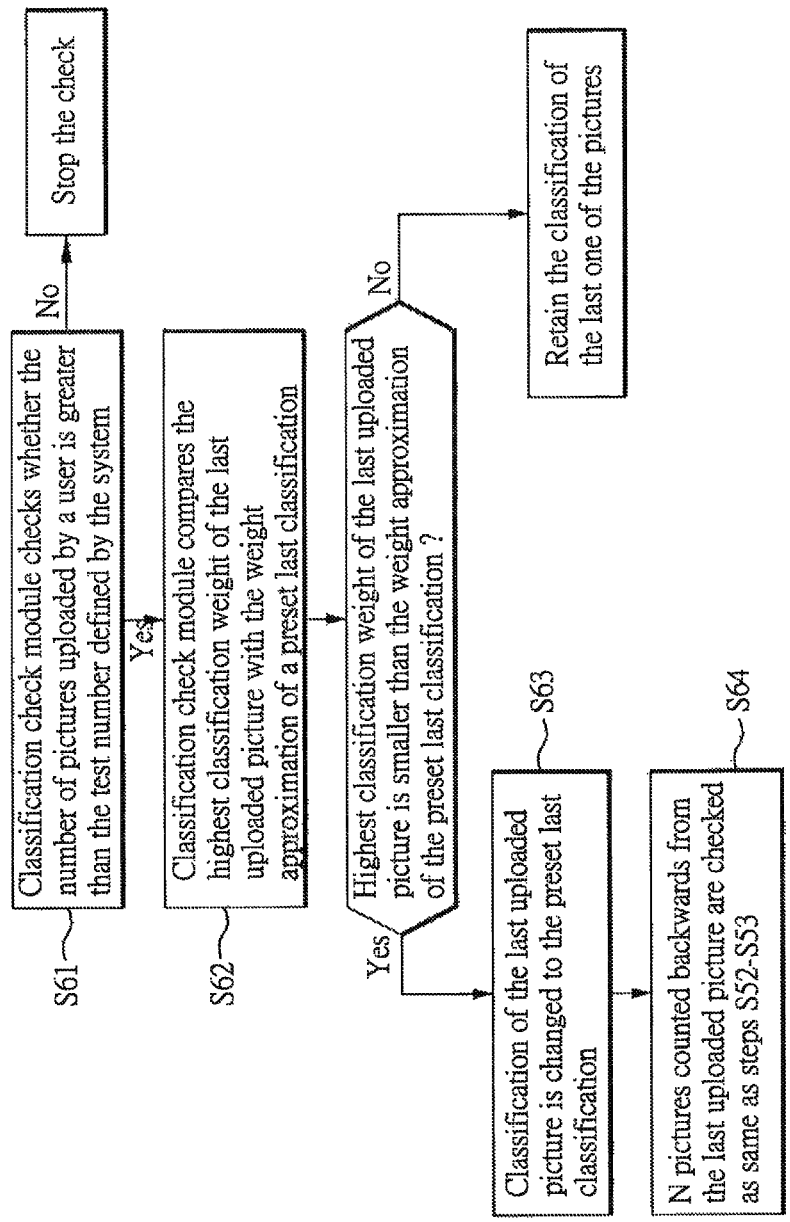
FIG. 6(A) is a flowchart illustrating another check operated by a classification check module according to the invention.

FIG. 6(A) schematically illustrates another check operated by a classification check module according to the invention. First, step S61 is executed, in which the classification check module 404 checks whether the number of pictures uploaded by a user is greater than the test number defined by the system and, if yes, step S62 is executed, in which the classification check module 404 compares the highest classification weight of the last uploaded picture with the weight approximation of a preset last classification, which is typically assigned to the dessert classification because the last dish normally offers a dessert in a dining sequence. When the highest classification weight of the last uploaded picture is smaller than the weight approximation of the preset last classification, step S63 is executed, in which the classification of the last uploaded picture is changed to the preset last classification. Next, step S64 is executed, in which N pictures counted backwards from the last uploaded picture are checked as same as steps S52-S53, where N is a positive integer greater than three.

Figure 6B:
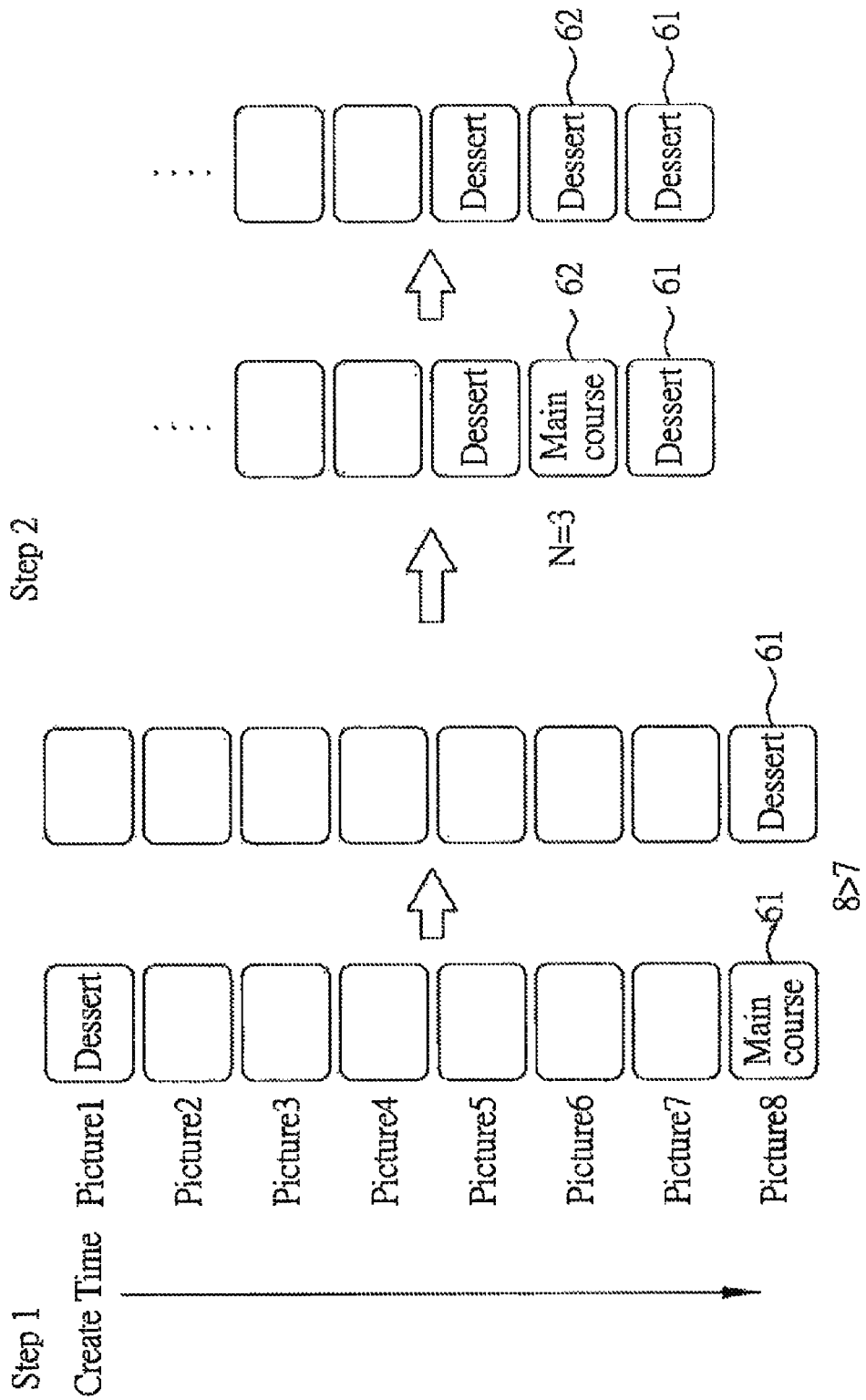
FIG. 6(B) schematically illustrates a practical process of FIG. 6(A) according to the invention.

FIG. 6(B) schematically illustrates a practical process of FIG. 6(A) according to the invention, in which N is set to be three and the test number is seven. As shown in FIG. 6(B), the classification check module 404 compares the highest classification weight of the eighth picture 61 with the weight approximation of the dessert classification, and the classification of the picture 61 is re-assigned to the dessert classification because the highest classification weight is smaller than the weight approximation. Next, three pictures counted backwards from the picture 61 are checked as same as steps S52-S53, and the middle one is re-assigned to the dessert classification because its highest classification weight is smaller than the weight approximation of the dessert classification.

Figure 7A:
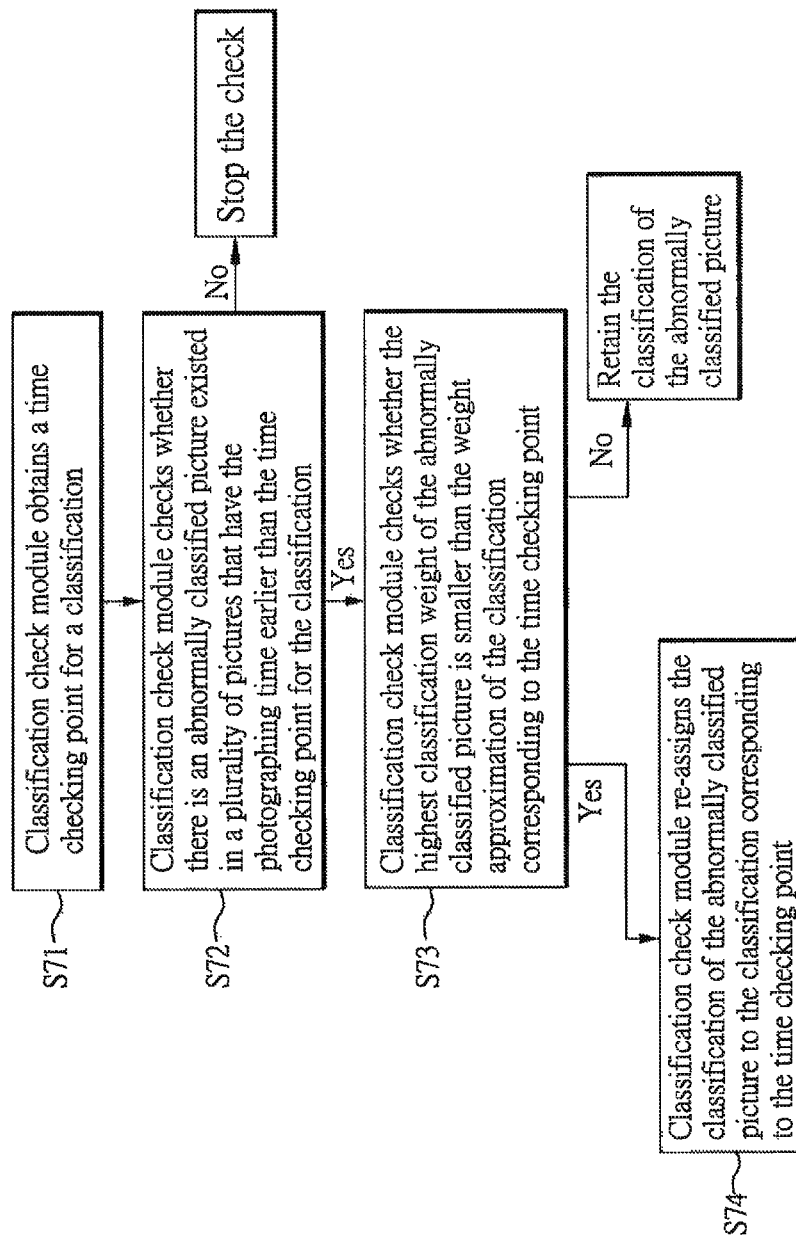
FIG. 7(A) is a flowchart for another operation of a further check operated by a classification check module according to the invention.

In addition, the classification check module 404 of the invention can operate a further check. FIG. 7(A) is a flowchart illustrating a further check operated by the classification check module 404 according to the invention. First, step S71 is executed, in which the classification check module 404 obtains a time checking point for a classification. The time checking point for the classification is preferably the first-time present point thereof during the creating time of all pictures. For example, if a dining duration is typically two hours and a dessert is offered on the table at one and half hours, users can arrange a time checking point for the dessert classification at one and half hours after the first picture is photographed. It is noted that the time checking point for each classification is arranged randomly by the users.

Next, step S72 is executed, in which the classification check module 404 checks whether there is an abnormally classified picture existed in a plurality of pictures that have the photographing time earlier than the time checking point for the classification. For example, if the time checking point for the main course classification is at half hour after the first picture is photographed and the time checking point for the dessert classification is at one and half hours after the first picture is photographed, i.e., the picture creating time of the dessert classification is later than that of the main course classification, the classification check module 404 checks whether there is a picture of the dessert classification existed in the pictures photographed before the time checking point for the main course classification. There is a very low probability to have the picture of the dessert classification present before the main course classification. However, in case of the picture of the dessert classification is present before the main course classification, step S73 is executed, in which the classification check module 404 checks whether the highest classification weight of this abnormally classified picture is smaller than the weight approximation of the classification corresponding to the time checking point. For example, when the classification check module 404 finds that one picture of the dessert classification presents before the time checking point for the main course classification, it compares the highest classification weight of the dessert classification and the weight approximation of the main course classification. When the highest classification weight of the dessert classification is smaller than the weight approximation of the main course classification, step S74 is executed, in which the classification check module 404 changes the picture from the dessert classification to the main course classification.

Figure 7B:
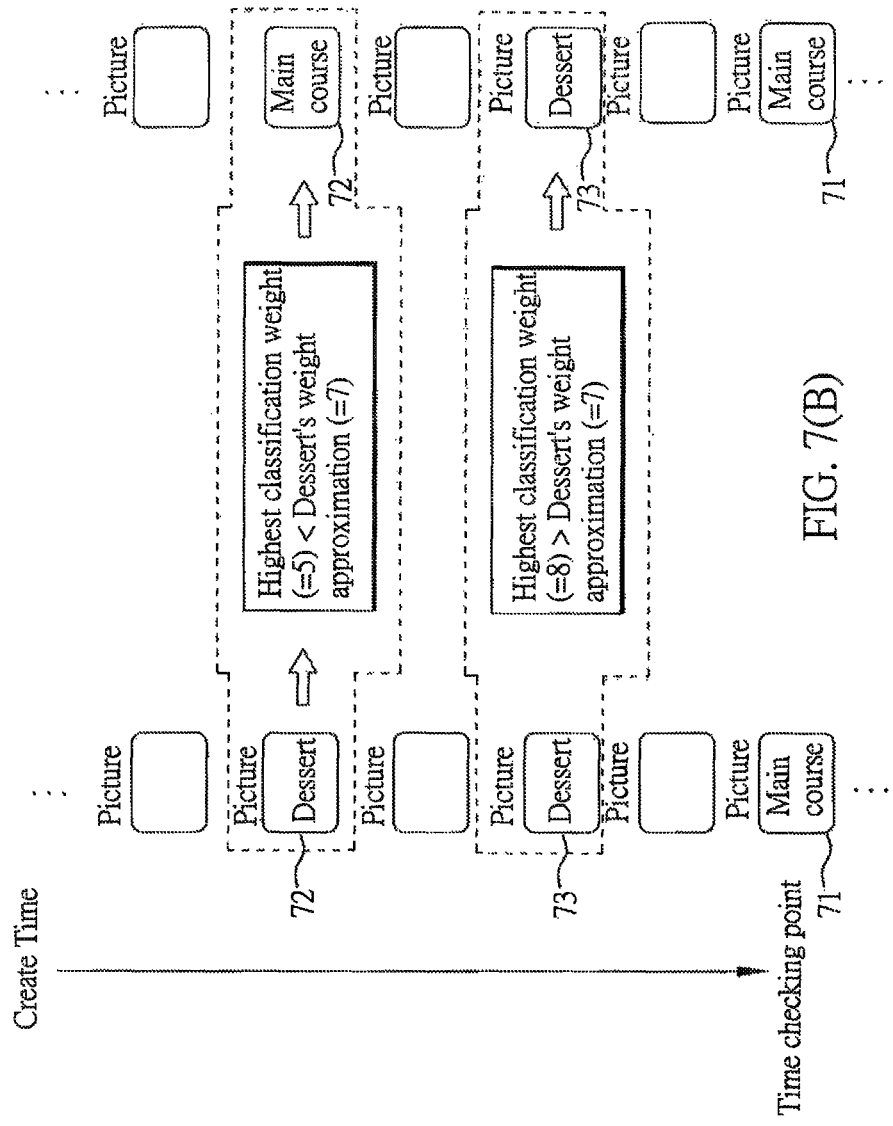
FIG. 7(B) schematically illustrates a practical process of FIG. 7(A) according to the invention.

FIG. 7(B) schematically illustrates a practical process of FIG. 7(A) according to the invention. As shown in FIG. 7(B), a time checking point 71 is set for the main course classification with a weight approximation of 7, and there are pictures of the dessert classification existed in the pictures that are photographed at the time earlier than the time checking point 71, wherein one abnormally classified picture 72 (dessert classification) has the highest classification weight of 5. Because the highest classification weight is smaller than the weigh approximation of the main course classification, the classification check module 404 changes the classification of the abnormally classified picture 72 from the dessert to the main classification. In addition, the other abnormally classified picture 73 (dessert classification) has the highest weight of 8. Because the highest weight is greater than the weigh approximation of the main course classification, the dessert classification of the picture 73 is retained.

Figure 7C:
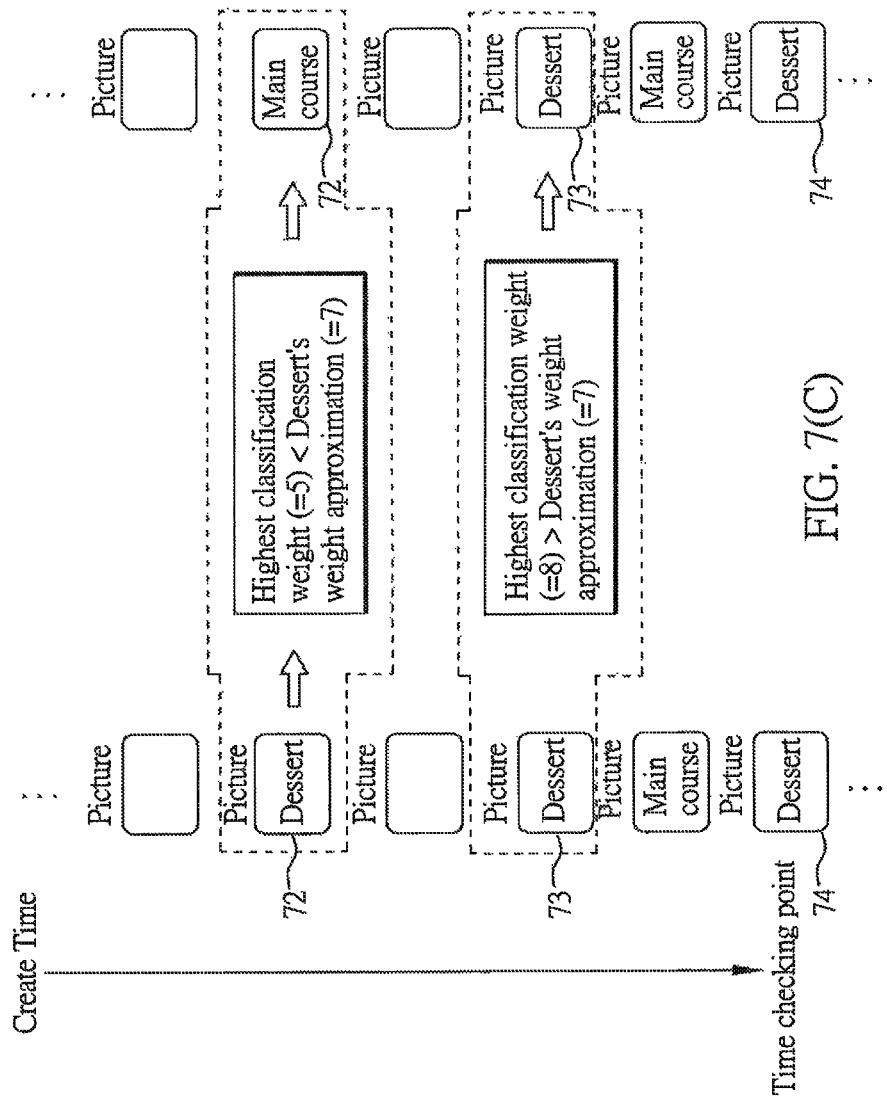
FIG. 7(C) schematically illustrates another practical process of FIG. 7(A) according to the invention.

In addition, because different users have different use habits, the accuracy of assigning the time checking point sometimes has a slight deviation. Therefore, in one embodiment, the check is configured to execute all steps S71-S74 when the main course classification of a previous picture exists immediately before the time checking point, even the time checking point is not for the main course classification. FIG. 7(C) schematically illustrates another practical process of FIG. 7(A) according to the invention. As shown in FIG. 7(C), a time checking point 72 is not for the main course classification, but the previous picture immediately before the picture corresponding to the time checking point 72 is of the main course classification, so that the classification check module 404 still changes the abnormally classified pictures, which have a highest classification weight smaller than the weight approximation of the main course classification, to the main course classification.

Figure 7D:
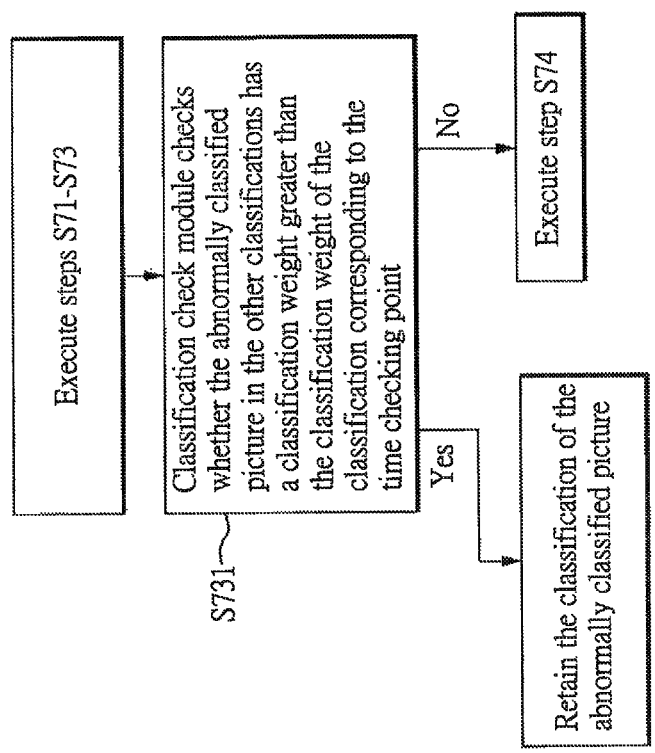
FIG. 7(D) is a flowchart of a mistake blocking process for the further check of FIG. 7(A) according to the invention.

Furthermore, the check of FIG. 7(A) may be provided with a mistake blocking process. FIG. 7(D) is a flowchart illustrating a mistake blocking process for the further check of FIG. 7(A) according to the invention. As shown in FIG. 7(D), the classification check module executes step S731 in order to check the classification weights of the abnormally classified pictures in all classifications. The classification check module 404 does not change the classification of an abnormally classified picture when the abnormally classified picture in the other classifications has a classification weight greater than the classification weight of a classification corresponding to the time checking point. For example, the classification check module 404 finds a picture of the dessert classification present before the time checking point corresponding to the main course classification, where the picture has a classification weight of 3 in the main course classification, a classification weight of 4 in the drink classification, and a classification weight of 5 in the dessert classification, while the weight approximation of the main course classification is 8. In this case, the highest classification weight of the dessert classification of the picture is smaller than the weight approximation of the main course classification (5<8), but the classification weight (4) of the drink classification for the picture is greater than that of the main course classification (3), so that the dessert classification of the picture is not changed, thereby avoiding a decision mistake.

Accordingly, the automatic classifying system 1 of the present invention is provided with a function of multiple classification verifications so as to gain a more accurate result in classification.

Figure 8A:
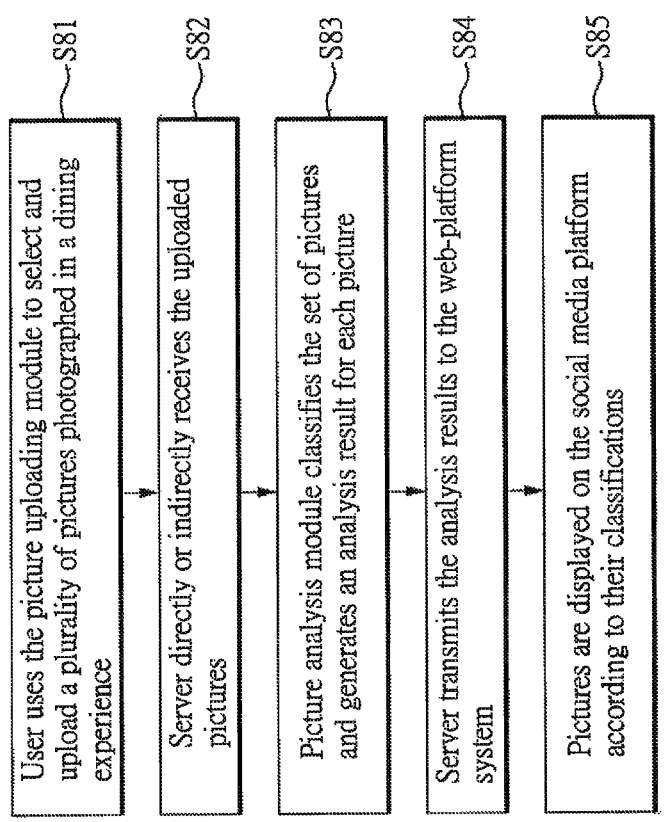
FIG. 8(A) is a flowchart of an automatic classifying method performed by an automatic classifying system in a dining environment according to the invention.

FIG. 8(A) is a flowchart of an automatic classifying method performed by an automatic classifying system in a dining environment according to the invention. For clear description, a preferred embodiment is given with reference to FIG. 1 and FIG. 8(A) and, in this embodiment, the electronic device 21 is a smartphone. The picture uploading module 20 is implemented in an application (APP) of the smartphone. The picture analysis module 401 is comprised of the appearance analyzing module 411, the staff analyzing module 412, the menu analyzing module 413, the main course analyzing module 414, the drink analyzing module 415, and the dessert analyzing module 416. Thus, the pictures can be classified into six classifications.

Figure 8B:
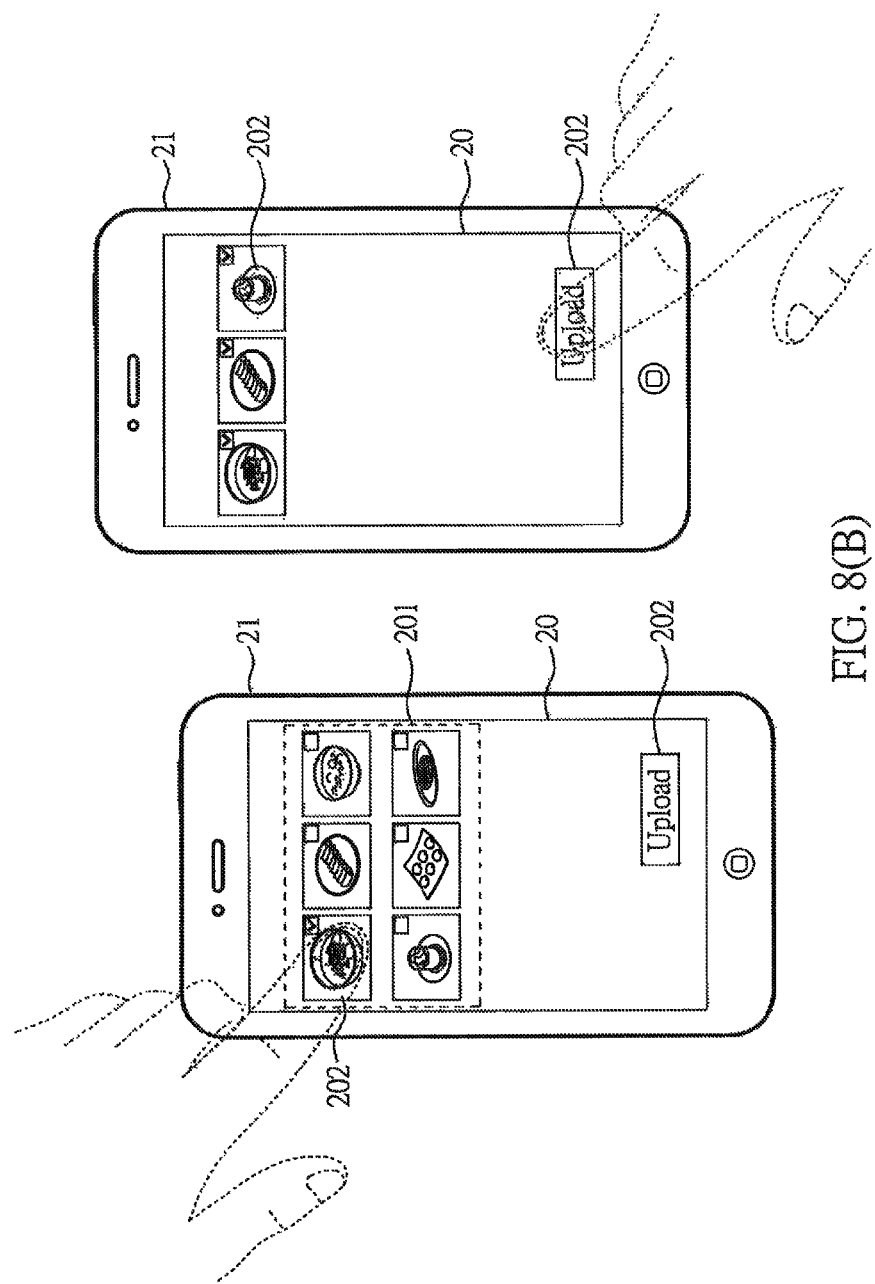
FIG. 8(B) schematically illustrates a practical operation of a picture uploading module according to the invention.

First, step S81 is executed, in which a user can use the picture uploading module 20 to select a plurality of pictures photographed in a dining experience for being uploaded to the Internet. FIG. 8(B) schematically illustrates a practical operation of the picture uploading module 20 according to the invention. As shown in FIG. 8, the picture uploading module 20 displays multiple pictures on the display interface 201, and the user can use the operation interface 202 to select the pictures to be uploaded. In addition, the picture uploading module 20 can be linked with a camera on the electronic device 21, such that, when the user applies the picture uploading module 20 to drive the camera to take pictures, the pictures uploading module 20 can upload the pictures in real-time.

After the pictures are uploaded, step S82 is executed, in which the server 40 directly or indirectly receives the uploaded pictures. Next, step S83 is executed, in which the picture analysis module 401 classifies the pictures and generates an analysis result for each picture. The analysis result of each picture can be checked and corrected by the classification check module 404. Next, step S84 is executed, in which the server 40 transmits the analysis results to the web-platform system 30 via the Internet. Next, step S85 is executed, in which the web-platform system 30 displays the pictures on the social media platform 301 according to their classifications. Thus, the netizens can be linked to the social media platform 301 via the Internet to browse the classified pictures according to the classifications.

Figure 8C:
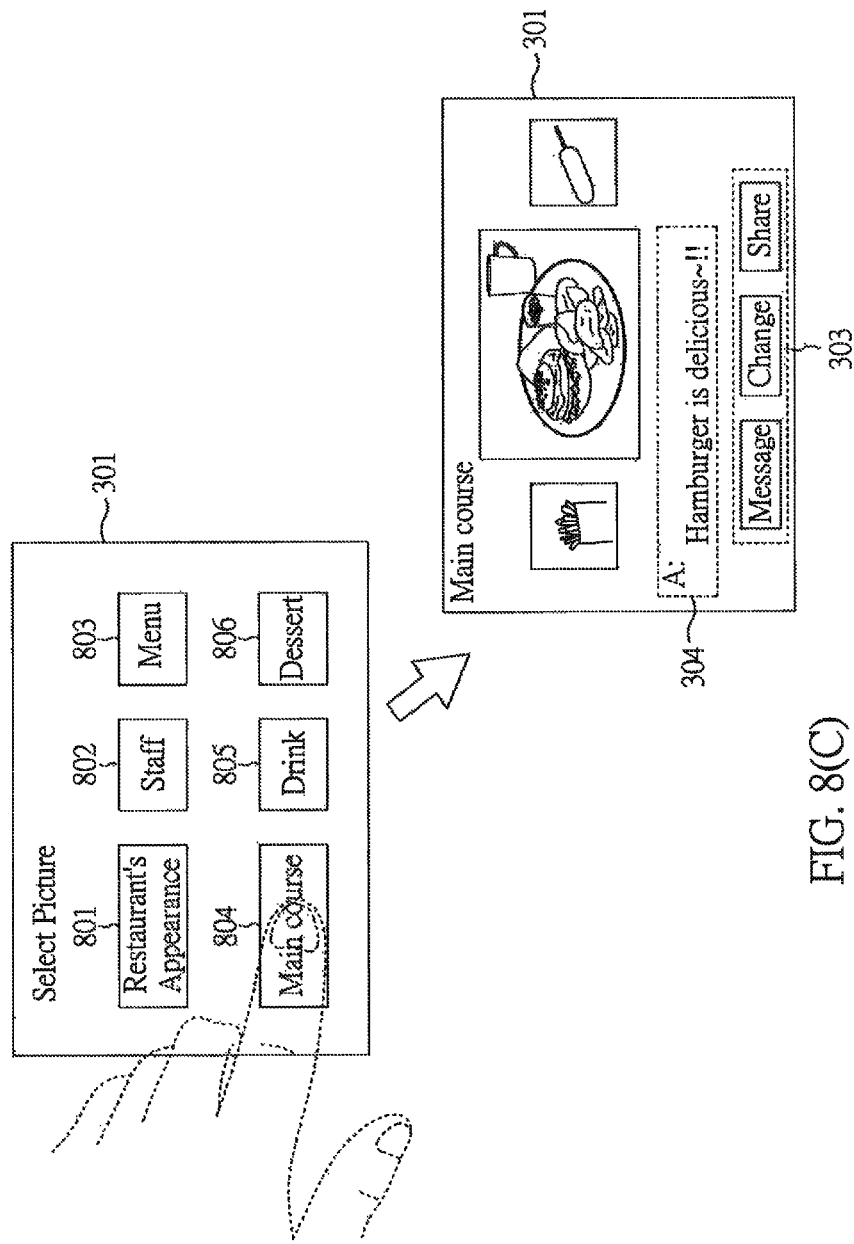
FIG. 8(C) schematically illustrates a practical operation of a social media platform according to the invention.

FIG. 8(C) schematically illustrates a practical operation of the social media platform 301 according to the invention. The social media platform 301 has six operation interfaces 801-806 respectively corresponding to six classifications, and each classification has its classified pictures. When an operation interface 801-806 corresponding to one of the six classifications is selected by a netizen, the social media platform 301 displays the classified pictures of this classification. In addition, the social media platform 301 is connected with an editing interface 303, which can fetch instructions externally inputted by the user or netizens and allow the social media platform 301 to generate answers. In a preferred embodiment, the editing interface 303 includes a message instruction to allow the user or netizens to publish their comments on the classified pictures. The editing interface 303 also includes a correction instruction to allow users to manually correct the classification of a picture. In addition, the social media platform also has an information forum 304 to display the information provided by users and the messages left by the netizens. In addition, in a preferred embodiment, the picture uploading module 20 can display the information of the social media platform 301. For example, the classified pictures of each classification and the corresponding messages can be simply displayed by the picture uploading module 20.

As cited, the invention provides an automatic classifying system in a dining environment for automatically classifying pictures photographed by users in a dining experience so as to save a great amount of manpower. The system further provides the social media platform for collecting the pictures and allowing others to conveniently use the information of the restaurants. In addition, the system further includes a function of classification verification to gain a more accurate result in classification.

Although the present invention has been explained in relation to its preferred embodiment, it is to be understood that many other possible modifications and variations can be made without departing from the spirit and scope of the invention as hereinafter claimed.

What is claimed is:

1. An automatic classifying system in a dining environment, comprising:
    a server for directly or indirectly receiving a set of pictures, the server including a picture analysis module to classify a picture, from the set of pictures, according to at least two classifications and generate an analysis result, wherein the set of pictures are received via Internet from an electronic device,
    wherein the server transmits the analysis result to a web-platform system for initiating display of the picture and the analysis result,
    wherein the picture analysis module analyzes the picture according to the at least two classifications for obtaining at least two classification weights corresponding to the at least two classifications, respectively, and selects a higher classification weight, of the at least two classification weights, and a classification associated with the higher classification weight as the analysis result for the picture,
    wherein the server further includes a classification check module for determining whether previous and next pictures, from the set of pictures, are of a same classification, and wherein the classification check module compares the higher classification weight corresponding to the picture with a weight approximation corresponding to a classification of the previous and next pictures when the previous and next pictures are associated with the same classification, and re-assigns the picture to the classification of the previous and next pictures when the higher classification weight is smaller than the weight approximation.

2. The automatic classifying system as claimed in claim 1, wherein the web-platform system includes an editing interface for receiving and answering externally inputted messages.

3. The automatic classifying system as claimed in claim 1, wherein the classification check module is further for determining whether the higher classification weight corresponding to a last picture in the set of pictures is smaller than a weight approximation of a preset classification, and re-assigning the last picture to the preset classification when the higher classification weight is smaller than the weight approximation.

4. The automatic classifying system as claimed in claim 1, wherein the classification check module is further for checking whether an abnormally classified picture is present in a plurality of pictures associated with at least one creating time earlier than a time checking point and comparing the higher classification weight of the abnormally classified picture with a weight approximation of a classification corresponding to the time checking point so as to determine whether the abnormally classified picture is or needs to be re-assigned to another classification.

5. The automatic classifying system as claimed in claim 1, wherein the picture analysis module includes at least two analyzing modules selected from an appearance analyzing module, a staff analyzing module, a menu analyzing module, a main course analyzing module, a drink analyzing module, and a dessert analyzing module.

6. An automatic classifying method in a dining environment, which is performed by an automatic classifying system, the method comprising:
using a server to directly or indirectly receive a set of pictures from an electronic device via Internet;
using a picture analysis module of the server to classify a picture, from the set of pictures, according to at least two classifications and generate an analysis result;
using the server to transmit the analysis result to a web-platform system for display of the picture and the analysis result on the web-platform system,
wherein the picture analysis module analyzes the picture according to the at least two classifications for obtaining at least two classification weights corresponding to the at least two classifications, respectively, and selects a higher classification weight, of the at least two classification weights, and a classification associated with the higher classification weight as the analysis result for the picture,
wherein the server further includes a classification check module for checking whether an abnormally classified picture is present in a plurality of pictures associated with at least one creating time earlier than a time checking point and comparing a higher classification weight of the abnormally classified picture with a weight approximation of a classification corresponding to the time checking point so as to determine whether the abnormally classified picture is or needs to be re-assigned to another classification.

7. The automatic classifying method as claimed in claim 6, wherein the web-platform system includes an editing interface for receiving and answering externally inputted messages.

8. The automatic classifying method as claimed in claim 6, wherein the classification check module is further for determining whether previous and next pictures, among the set of pictures, are of a same classification, and wherein the classification check module compares the higher classification weight corresponding to the picture with a weight approximation corresponding to a classification of the previous and next pictures when the previous and the next pictures are of the same classification, and re-assigns the picture to the classification of the previous and next pictures when the higher classification weight is smaller than the weight approximation.

9. The automatic classifying method as claimed in claim 6, wherein the classification check module is further for determining whether the higher classification weight corresponding to a last picture in the set of pictures is smaller than a weight approximation of a preset classification, and re-assigning the last picture to the preset classification when the higher classification weight is smaller than the weight approximation.

10. The automatic classifying method as claimed in claim 6, wherein the picture analysis module includes at least two analyzing modules selected from an appearance analyzing module, a staff analyzing module, a menu analyzing module, a main course analyzing module, a drink analyzing module, and a dessert analyzing module.

\* \* \* \* \*